United States Patent [19]
Takahashi et al.

[11] Patent Number: 5,771,217
[45] Date of Patent: Jun. 23, 1998

[54] MAGNETO-OPTICAL DISK APPARATUS HAVING A EJECTOR ARM AND MAGNETIC FIELD GENERATING MEANS MOUNTED ON A STATIONARY BASE

[75] Inventors: Mitsuo Takahashi; Koji Asako, both of Tokyo; Kazuhiko Kageyama, Kawasaki; Yoshihiro Sato, Kawasaki; Shigeru Arai, Kawasaki, all of Japan

[73] Assignees: Copal Company Limited; Fujitsu Limited, both of Japan

[21] Appl. No.: 400,389

[22] Filed: Mar. 3, 1995

Related U.S. Application Data

[63] Continuation of Ser. No. 67,867, May 27, 1993, abandoned.

[51] Int. Cl.$^6$ ............................ G11B 13/04; G11B 17/04
[52] U.S. Cl. ............................................. 369/77.2; 369/13
[58] Field of Search ................................ 369/77.2, 77.1, 369/270, 264, 13, 75.2; 360/114, 98.08, 99.12

[56] References Cited

U.S. PATENT DOCUMENTS

| | | | |
|---|---|---|---|
| 4,731,775 | 3/1988 | Katsuyama et al. | 369/77.2 |
| 4,740,937 | 4/1988 | Watanabe | 369/13 |
| 4,823,214 | 4/1989 | Davis | 360/99.12 |
| 5,164,925 | 11/1992 | Sato et al. | 369/13 |
| 5,202,861 | 4/1993 | Yoshida | 360/114 |
| 5,204,793 | 4/1993 | Plonczak | 360/97.01 |
| 5,224,079 | 6/1993 | Inoue | 369/13 |
| 5,226,024 | 7/1993 | Mukawa | 369/13 |
| 5,229,900 | 7/1993 | Arai et al. | 369/77.2 |
| 5,258,965 | 11/1993 | Sekine et al. | 369/13 |
| 5,440,436 | 8/1995 | Iftikar et al. | 360/99.12 |

FOREIGN PATENT DOCUMENTS

| | | |
|---|---|---|
| 4-92252 | 3/1992 | Japan. |
| 4-98649 | 3/1992 | Japan. |

*Primary Examiner*—Stuart S. Levy
*Assistant Examiner*—Brian E. Miller
*Attorney, Agent, or Firm*—Finnegan, Henderson, Farabow, Garrett & Dunner, L.L.P.

[57] ABSTRACT

A disk apparatus in which the thickness is suppressed. A recording/reproducing medium containing a disk rotatably in a hard case is moved substantially in a horizontal direction through an opening of the base of the disk apparatus for insertion and ejection operations of the recording/reproducing medium and recording/reproducing operation. For this purpose, the following are provided: a recording/reproducing unit for performing recording and reproduction, a container for containing the recording/reproducing medium at a predetermined position in the disk apparatus when the disk is inserted, a rotation motor for giving a predetermined turning effort by performing the chucking to the recording/reproducing medium, a chucking position where the chucking is performed, a vertical movement mechanism for moving the rotation motor to the waiting position where the recording/reproducing medium is inserted or ejected, a control mechanism for retaining the vertical movement mechanism to the chucking position, and a release mechanism for releasing and ejecting the recording/reproducing medium.

5 Claims, 12 Drawing Sheets

MAGNETO-OPTICAL DISK APPARATUS HAVING A EJECTOR ARM AND MAGNETIC FIELD GENERATING MEANS MOUNTED ON A STATIONARY BASE

This application is a continuation of application Ser. No. 08/067,867, filed May 27, 1993, now abandoned.

BACKGROUND OF THE INVENTION

The present invention relates to a disk apparatus which records and reproduces on/from a rotatable disk medium. More particularly, it relates to a disk apparatus which is preferable when a thin magneto-optic disk apparatus is constructed.

Conventionally, a magnetic disk apparatus which performs recording and reproducing on/from a 3.5-inch magnetic disk medium provided rotatably in a hard case is used with the hard disk apparatus built in various computers and word processors. Such apparatus has been generally identified as an external storage device.

A 3.5-inch magneto-optic disk medium used for a magneto-optic disk apparatus has substantially the same shape as that of the magnetic disk medium, however, it is contained in a hard case where the thickness and chamfer portion are different from those of the magnetic disk.

Referring to the figures, the configuration of the magneto-optic disk apparatus is described below. FIG. 1A is a top view of the magneto-optic disk 100, FIG. 1B is a side view of the magneto-optic disk 100, and FIG. 1C is a bottom view of the magneto-optic disk 100. As shown in FIGS. 1A through 1C, the magneto-optic disk 100 consists of a hard case 100a made from resin, and a disk medium 120 indicated by a broken line which is built-in rotatably. The disk medium 120 is accessible outside through a large opening 104 (refer to FIG. 1A) and small opening 109 (refer to FIG. 1C) so as to perform the open/close operation of a shutter 103 which is integrated with the magneto-optic disk 100.

While turning effort is transmitted to the disk medium 120 by a chucking of the central portion of the disk medium 120 through the large opening 104, the magneto-optic disk 100 is initialized by exposing the disk medium 120 to an external magnetic field through the small opening 109.

The shutter 103 is constituted by bending a stainless metallic plate made of a non-magnetic material in a U-shape, and thus, a face portion 103a and back portion 103b of the shutter 103 are formed as a unit. Furthermore, the face portion 103a and back portion 103b are incorporated into a slide portion 103c which is set into a guide groove formed on the side face of the hard case 100a.

With the above arrangement, when the shutter 103 is opened, an end of the slide portion 103c is pressed and slid by a pin inserted in a slanting surface 112 of the case against the resistance of an energized member (not shown). The closed shutter 103 as shown in FIG. 1C is slid in the arrow's direction to be opened.

At the corner of the hard case 100a, a chamfer 107 is formed so as to avoid inserting the disk medium 120 upside down. Furthermore, in the back side of the hard case 100a, a pair of reference concavities 101 and 102 are provided so as to be a reference line in the direction of X—X of the magneto-optic disk 100 in order to reserve each reference size (56, 53, 55, 54 mm) for chucking and obtain a reference face P after the chucking. Furthermore, the hard case 100a is provided with semi-circle concavities 105 and 106 and concavities 110 and 111 which are engaging portions when the disk medium 120 is inserted/ejected in an automatic disk apparatus.

The thickness of the resin hard case 100a is approximately 6 mm and it is essentially twice as thick as that of the 3.5-inch magnetic disk media. The above magneto-optic disk 100 has been recently determined as an International Standard.

SUMMARY OF THE INVENTION

In addition to the above-described magnetic disk medium, the thickness of 3.5-inch magneto-optic medium is twice that of the 3.5-inch magnetic disk medium. Therefore, it is difficult to construct a magneto-optic disk apparatus as thin as the magnetic disk apparatus. In the magnetic disk apparatus where the chucking is performed after insertion the magnetic disk medium is moved vertically by a chucking motor fixed on the side of the apparatus body. If a general mechanism is adapted to the magneto-optic disk apparatus, a problem arises such that the apparatus cannot be constituted to be thin because a shifting stroke twice the thickness of the magneto-optic disk 100 is required.

Accordingly, in view of the above problems, it is the first object of the present invention to provide a disk apparatus in which the thickness is as thin as possible.

The second object of the present invention is to provide a magneto-optic disk apparatus in which the thickness is as thin as possible.

The third object of the present invention is to provide a disk apparatus where the thickness of a magneto-optic disk apparatus is suppressed to be minimum and tracking capability for the recording/reproducing medium is superior.

According to the present invention, the foregoing object is attained by a magnetic disk apparatus which moves, substantially in a horizontal direction through an opening of the base of the disk apparatus, a recording/reproducing medium contained rotatably in a hard case and performs insertion and ejection of the recording/reproducing medium and recording and reproducing, comprising: recording/reproducing means for performing the recording and reproducing; a container for containing the recording/reproducing medium in a predetermined position when the disk is inserted; rotation means for providing turning effort by performing chucking on the recording/reproducing medium; vertical movement means for moving the rotation means vertically between the chucking position where the chucking is performed and a waiting position where the recording/reproducing medium is inserted or ejected; control means for controlling the vertical movement means to retain the chucking position; and release means for releasing and ejecting the recording/reproducing medium.

According to the present invention, the foregoing object is attained by a magneto-optic disk apparatus which moves, substantially to a horizontal direction though an opening of the base of the magneto-optic disk apparatus, a recording/reproducing medium contained rotatably in a hard case and performs insertion and ejection of the recording/reproducing medium and recording and reproducing, comprising: recording/reproducing means for performing the magneto-optic recording and reproducing; a container for containing the magneto-optic recording/reproducing medium in a predetermined position when the disk is inserted; rotation means for providing turning effort by performing chucking on the magneto-optic recording/reproducing medium; vertical movement means for moving the rotation means vertically between the chucking position where the chucking is performed and a waiting position where the magneto-optic recording/reproducing medium is inserted or ejected; control means for controlling the vertical movement means to retain the chucking position; and release means for releasing and ejecting the magneto-optic recording/reproducing medium.

According to the present invention, the foregoing object is attained by a magneto-optic disk apparatus which moves, substantially to a horizontal direction though an opening of the base of the magneto-optic disk apparatus, a recording/reproducing medium contained rotatably in a hard case and performs insertion and ejection of the recording/reproducing medium and recording and reproducing, comprising: recording/reproducing means for performing the magneto-optic recording and reproduction; a container for containing the magneto-optic recording/reproducing medium in a pre-determined position when the disk is inserted; rotation means for providing turning effort by performing chucking on the magneto-optic recording/reproducing medium; vertical movement means for moving the rotation means vertically between the chucking position where the chucking is performed and a waiting position where the magneto-optic recording/reproducing medium is inserted or ejected; control means for controlling the vertical movement means to retain the chucking position; and release means for releasing and ejecting the magneto-optic recording/reproducing medium, and the moving optical system of the magneto-optic recording/reproducing medium and the rotation means of the magneto-optic recording/reproducing means are provided so as to face to an upper surface of the container.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

Figure 2:
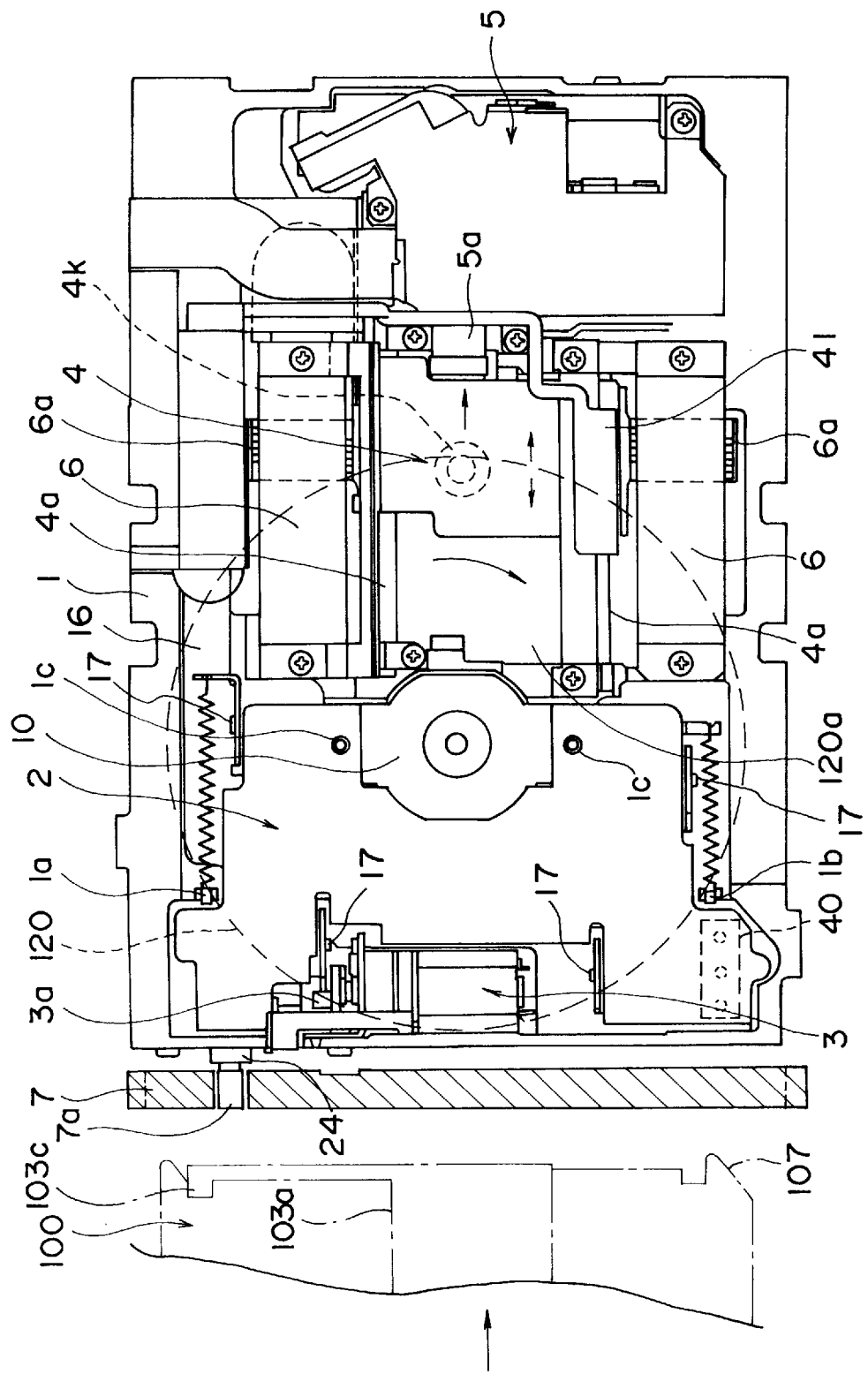
FIG. 2 is a perspective view of a magneto-optic disk apparatus of an embodiment.
Figure 3:
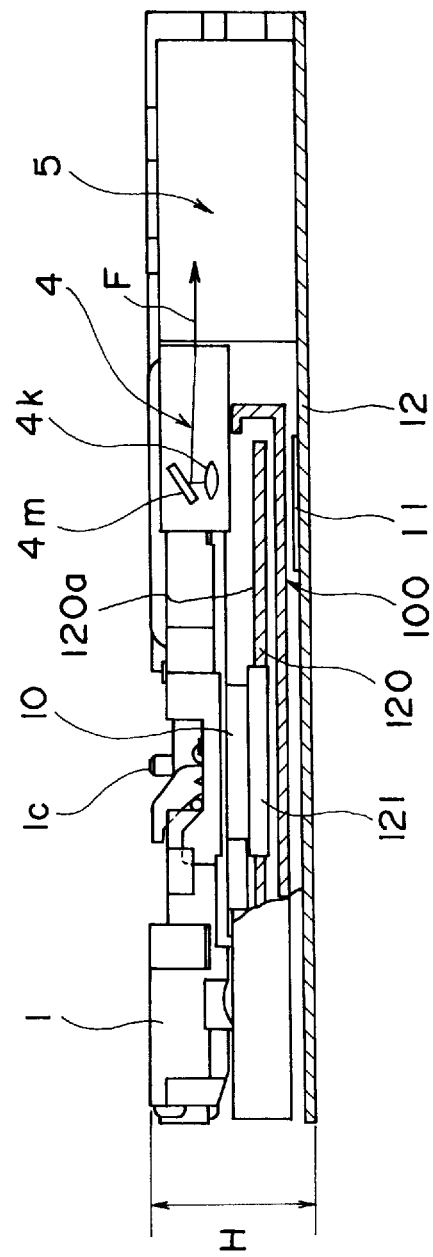
FIG. 3 is a cross-sectional view of the main portion of FIG. 2.

FIG. 2 is a perspective view of a magneto-optic disk apparatus of the embodiment where a panel 7 is provided for the magneto-optic disk apparatus with a magneto-optic disk 100. FIG. 3 is a cross-sectional view of the main part of FIG. 2.

In FIGS. 2 and 3, the base of the apparatus is comprised of a base 1 formed by aluminum die-casting and a metallic plate base 12 formed by performing a press-bending processing on a plate material (e.g. approximately 1 mm thickness) of a SUS system of the non-magnetic materiel. The base 1 is integrated with the plate base 12 by screw threads. A containing portion 12h, 12k, 28 (see FIG. 9) for inserting/ejecting the magneto-optic disk 100 is provided in the plate base 12, while each of the elements described later is mounted on the base 1.

The elements are described starting with the side of an opening for inserting/ejecting the magneto-optic disk 100. Inside of the side wall of the base 1, an ejecting motor assembly 3 is fixed on the base 1. The magneto-optic disk 100 is ejected when a pin 3a is rotated through a predetermined angle and stopped in accordance with an electrical signal. This electrical signal is transmitted from the main body side connected to the apparatus or it can be obtained by directly pressing a push switch 24 fixed on the side face of the base 1 through a switch button 7a on the panel 7.

A motor assembly 2 having a chucking motor 10 so as to partially surround the ejecting motor assembly 3 is slidably provided in the direction of the face and back of the diagram of FIG. 2 (by the mechanism described later). At the left corner of the motor assembly 2, a mechanical pressure type sensor 40 is provided in order to detect whether or not the magneto-optic disk 100 is contained and the like. It is actually detected by pressing the hard case 100a of the magneto-optic disk 100.

At the right side of the motor assembly 2 (the rear portion of the apparatus), a pair of a linear motors 6 is mounted on the base 1. Coils 6a are fixed on both sides of a movable optical system 4 which is slid and guided by a pair of ceramic carriage shafts 4a provided in parallel. The coils 6a are inserted into each linear motor 6 and the movable optical system 4 is moved along with the radius direction of the disk media 120 indicated by the broken line by electrifying the coils 6a. Accordingly, a tracking operation to access a predetermined track of the magneto-optic disk 100 is enabled.

In order to control the tracking operation of the movable optical system 4, a detector 41 which detects, without any contact, a moving speed and moved location of the movable optical system 4 is provided in parallel to each carriage shaft 4a. The movable optical system 4 can be driven at high speed by control of a servo motor comprising the detector 41, the apparatus is constituted in a considerably flat shape as a whole due to the pair of linear motors, and it is possible to move smoothly by avoiding the external force except in the moving direction.

The movable optical system 4 includes a lens 4k and reflection mirror 4m having a function which automatically focuses on the surface 120a of the magneto-optic disk. The disk surface 120a is exposed by a laser beam which is outputted from a fixed optical system 5 in the right side of the base 1. Then, the beam is incidenced into the fixed optical system 5 and magneto-optic recording/reproduction is performed.

As described above, each element is contained in the space between the base 1 and plate base 12 without extra empty space. Accordingly, the thickness H where the magneto-optic disk 100 shown in FIG. 3 is contained in the disk apparatus can be suppressed as much as possible. That is, if the chucking motor 10 is arranged to perform chucking by moving in the vertical direction when the magneto-optic disk 100 is inserted, an extra space for one magneto-optic disk needs to be reserved and the thickness H cannot be reduced. Therefore, in order to reduce the thickness H, it is arranged so that the chucking motor 10 performs magnetic chucking on a metallic core 121 of the disk medium 120 by synchronizing with the insertion of the magneto-optic disk 100. Furthermore, a flat coil 11 for external magnetic field generation is directly adhered and provided on the plate base 12, thus resulting in reduction in the thickness.

A construction which is an example of the mechanism for performing the chucking operation based on the present application is described below in detail referring to the figures.

Figure 4:
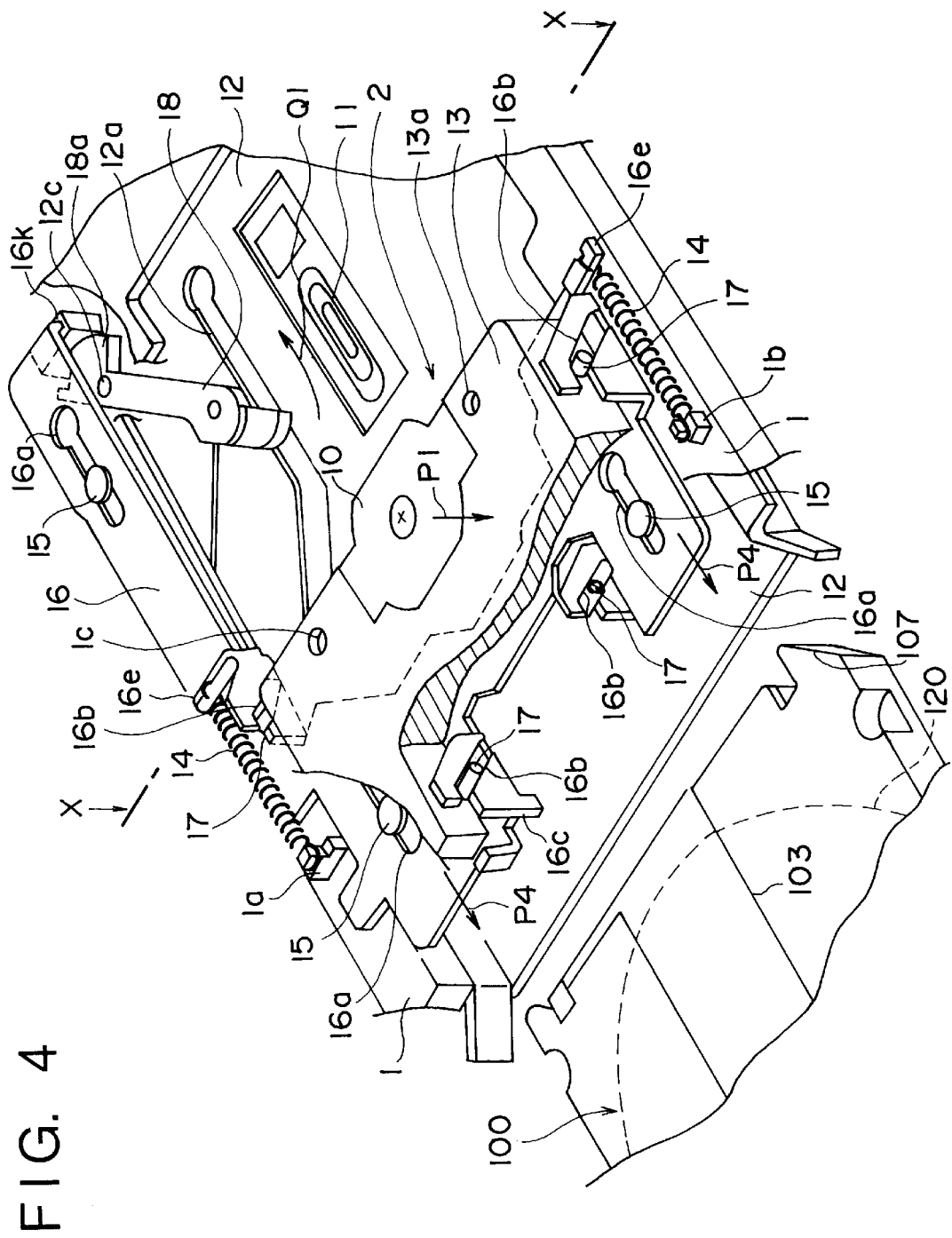
FIG. 4 is a perspective view of the magneto-optic disk apparatus before the disk 100 is inserted.

FIG. 4 is a perspective view of the magneto-optic apparatus 100 showing the mechanism which moves the motor assembly 2 by interlocking with the insertion of the magneto-optic disk 100. In FIG. 4, hooks 1a and 1b are integrated with the base 1, and each of the hooks 1a and 1b forms a spring hook portion which is one end of the tension spring 14 provided to attach to the slide plate 16.

A pair of guide pins 1c and three flat-headed pins 15 are integrated with the base 1. Each of the guide holes 13a of a pair of bushes which is provided so that each of the guide pins 1c is fitted in the guide hole 13a. The base 13 can be moved in the direction of the arrow P1 in the figure. The guide holes 13a are formed by insert-molding to the base made from resin. Furthermore, metallic pins 17 which are projected for a predetermined length are respectively provided at four places on the side face of the base 13. Similar to the guide holes 13a, they are formed by the insert-molding.

On the other hand, an inclined groove 16b is formed in order to slide guide each pin 17 provided on the side face of the base 13. The slide plate 16 formed by the bending processing has three guide holes 16a which are respectively guided by the flat-headed pins 15 fixed to the base 1. When the head pin 15 is inserted into a larger circular opening of the guide hole 16a and shifted to the direction of the arrow P4, the flat-headed pin 15 is prevented from being detached and the plate 16 can be slid in the horizontal direction. Hooks 16e are further integrated with the slide plate 16, of which are respectively placed on the right and left sides of the plate 16. The springs 14 are respectively provided between the hook 16e and the hooks 1a, 1b, and thus, the slide plate 16 is energized to move to the side of the magneto-optic disk 100, the direction of the arrow P4 in FIG. 4.

This state is controlled in the position where the head 18a of an arm 18 (to be described later) contacts a slide member 16k which is formed from the soft resin having high lubricity fixed on a point extending to the rear portion of the apparatus from the left side of the slide plate 16. The base 13 stands by at a predetermined position by not moving the slide plate 16 in the direction of the arrow P4.

When the magneto-optic disk 100 is inserted, the arm 18 is rotated in the direction of the arrow Q1 by being pushed by the leading surface of the magneto-optic disk 100. As a result of the rotating operation, the contacting state of the head 18a of the arm 18 and the slide member 16k is released and the slide plate 16 is moved in the direction of the arrow P4 by the tension spring 14. Accordingly, since each pin 17 is moved downward along with the inclined groove 16b, the base 13 is moved in the direction of the arrow P1.

Figure 5:
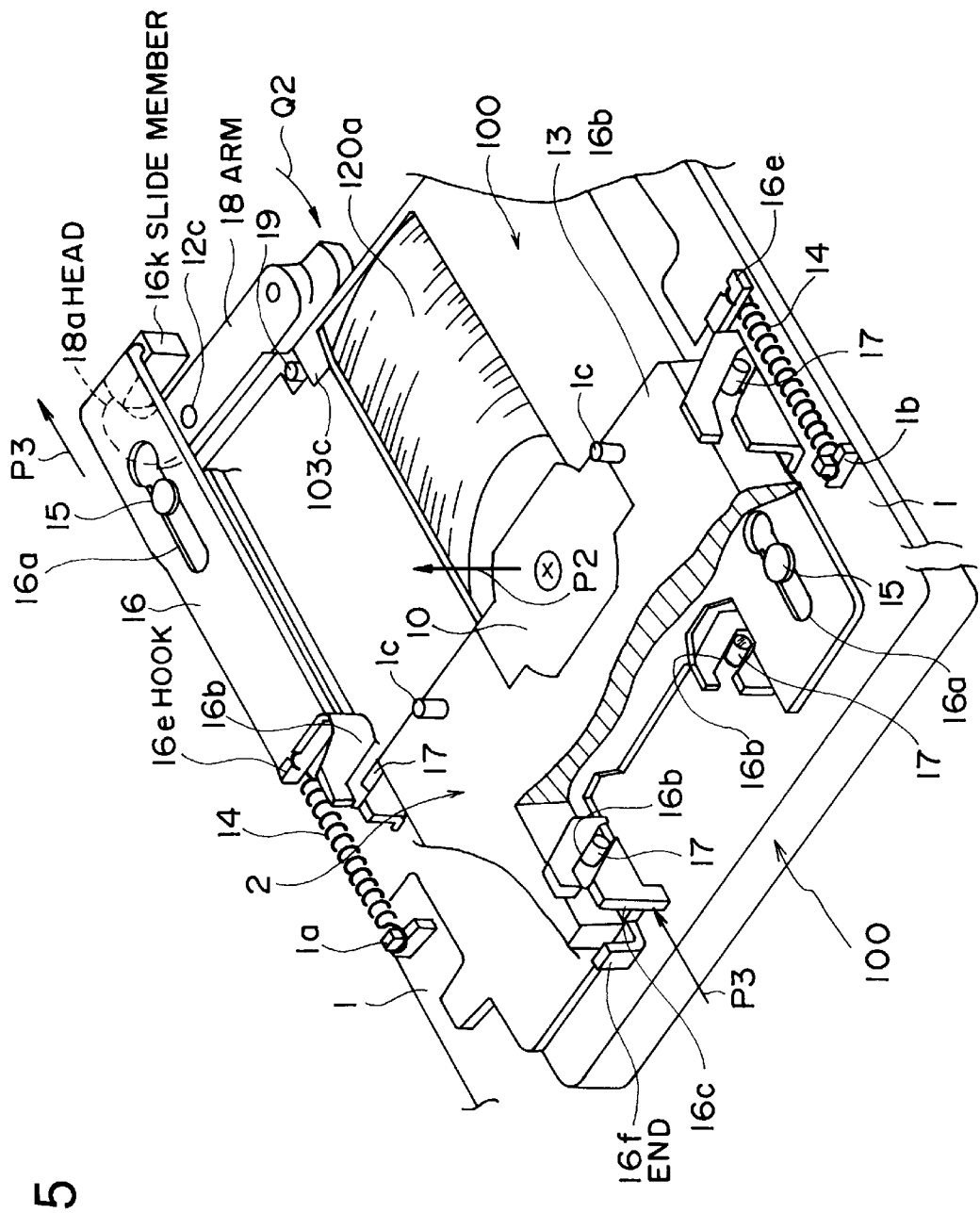
FIG. 5 is a perspective view of the magneto-optic disk apparatus when the disk 100 is inserted.

FIG. 5 is a partial perspective view of the magneto-optic disk apparatus where the magneto-optic disk 100 is inserted. FIG. 5 shows the chucking state. For this state, the magneto-optic disk 100 is inserted, the arm 18 is rotated to the direction of the arrow Q1 of FIG. 4 and the slide plate 16 is released. Then, the base 13 is moved in the direction of the arrow P1 and the chucking motor 10 provided on the base 13 is made to the chucking state for the disk media 120. Thus, the chucking ends.

When the magneto-optic disk 100 is ejected to the outside, the end portion 16c of the slide plate 16 is pressed to the direction of the arrow P3 by the pin 3a of the ejecting motor assembly 2 and the engaging state of the slide member 16k fixed on the end of the slide plate 16 and the head 18a of the arm 18 is released.

The arm 18 is provided with a large torsion spring which is described later. Since the arm 18 is energized to the direction of the arrow Q2 by strong force, the side face of the magneto-optic disk 100 is pushed by the rotating operation of the arm 18 and the disk 100 is ejected. A force of the tension spring 14 works on the slide plate 16 simultaneously. Accordingly, the base 13 is moved in the direction of arrow P2 vertically, as shown in FIG. 5, then the chucking state is released.

Figure 1A:
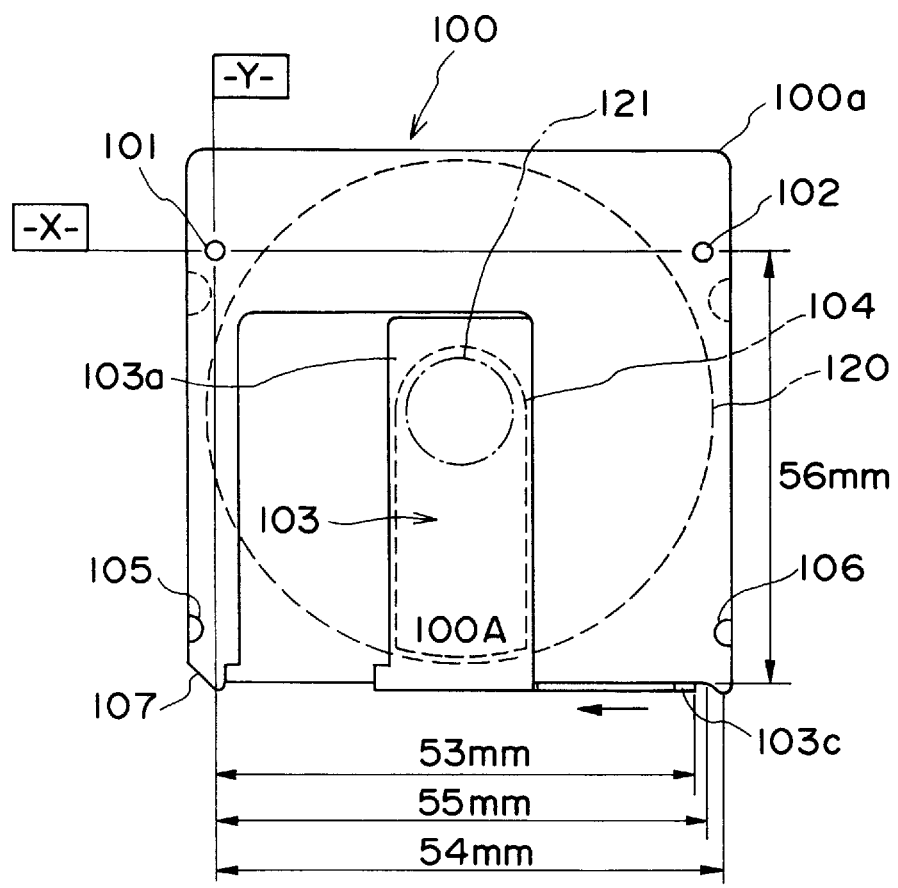
FIG. 1A is a top view of a magneto-optic disk 100.
Figure 1B:
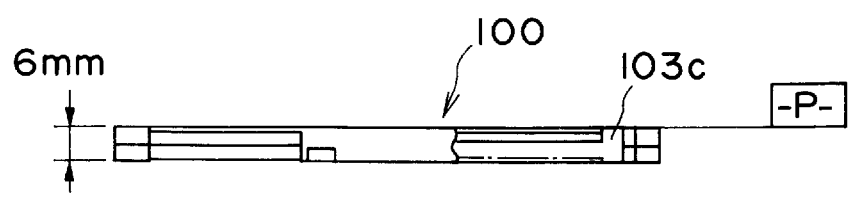
FIG. 1B is a side view of the magneto-optic disk 100.
Figure 1C:
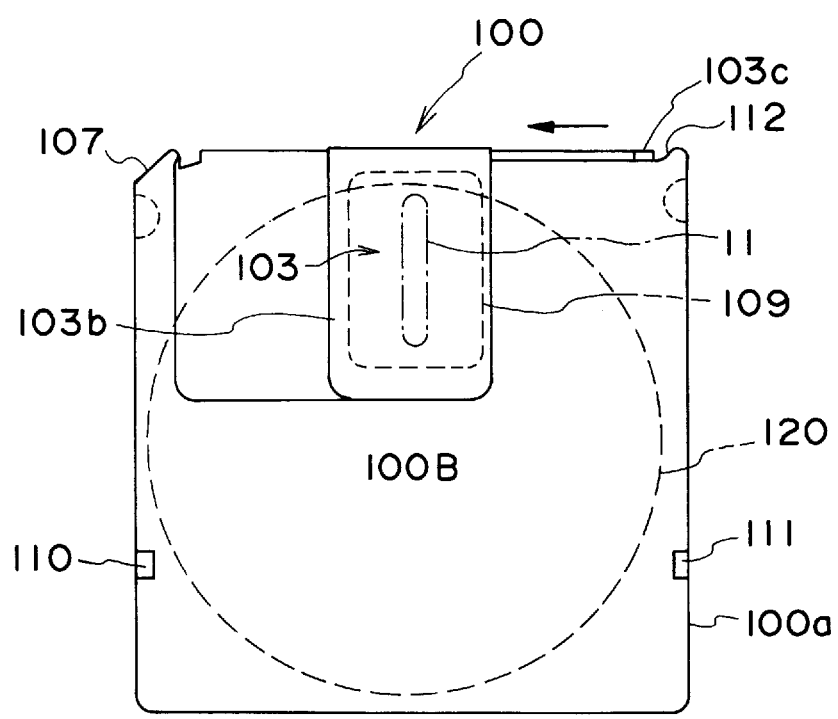
FIG. 1C is a bottom view of the magneto-optic disk 100.

Furthermore, an open pin 19 opens/closes shutter 103 by interlocking and moving for the operation of the ejecting rotation of the arm 18. The open pin 19 opens the shutter 103 as shown in the FIG. 5 with respect to the slide portion 103c of the shutter 103 made from resin which is slidably guided by inserting in the guide groove formed on the side face of the case described in FIG. 1.

Figure 6:
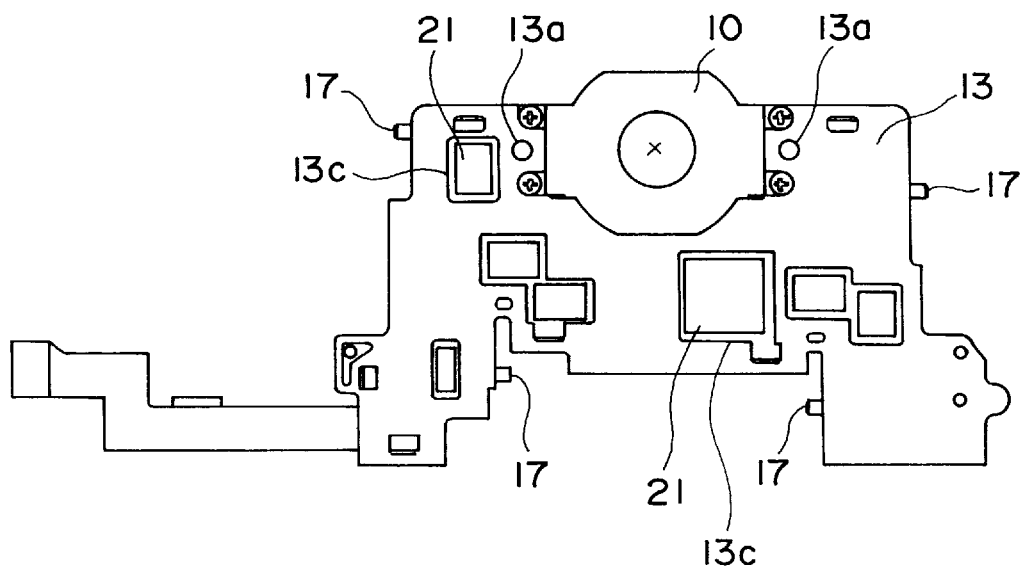
FIG. 6 is a top view of the base 13.
Figure 7:
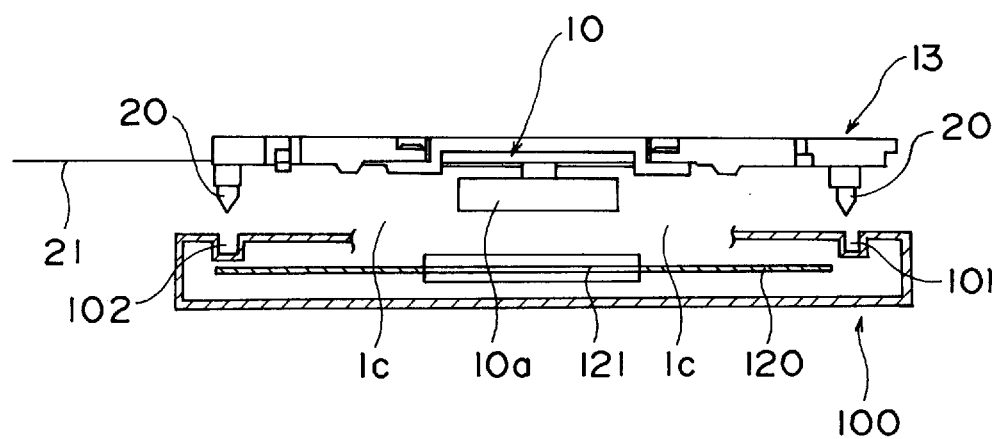
FIG. 7 is a side view of the base 13.

FIG. 6 is a top view of the base 13 and FIG. 7 is a side view of the base 13. In both figures, a flange 10a having a permanent magnet is fixed on the output shaft in the chucking motor 10 and the chucking is performed so as to chuck the chucking portion 121 of the disk medium 120 of the magneto-optic disk 100. The chucking motor 10 is fixed to the base 13 where various parts are insert-molded by screwing.

Locating pins 20 which respectively fit in a pair of the reference concavities 101, 102 are provided in the back side of the hard case 100a. The relative position of the base 13 can be simultaneously determined to the hard case 10a. Insulation of an electronic part 21 mounted on a flexible base 13c is provided by resin molding.

Figure 8A:
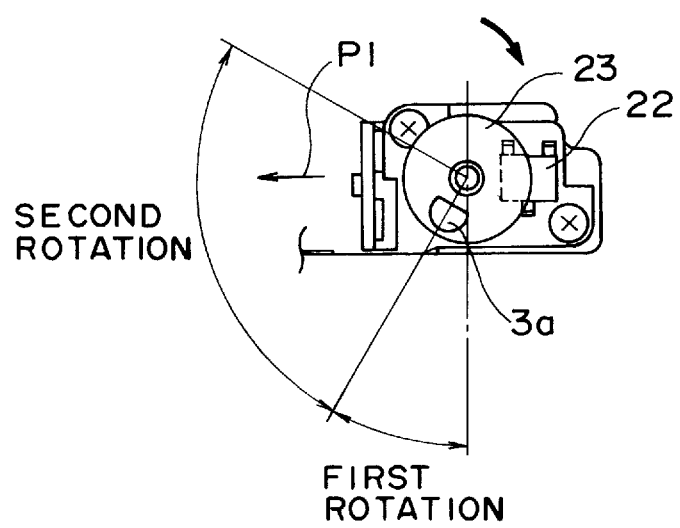
FIG. 8A is a top view of an ejecting motor assembly 3.
Figure 8B:
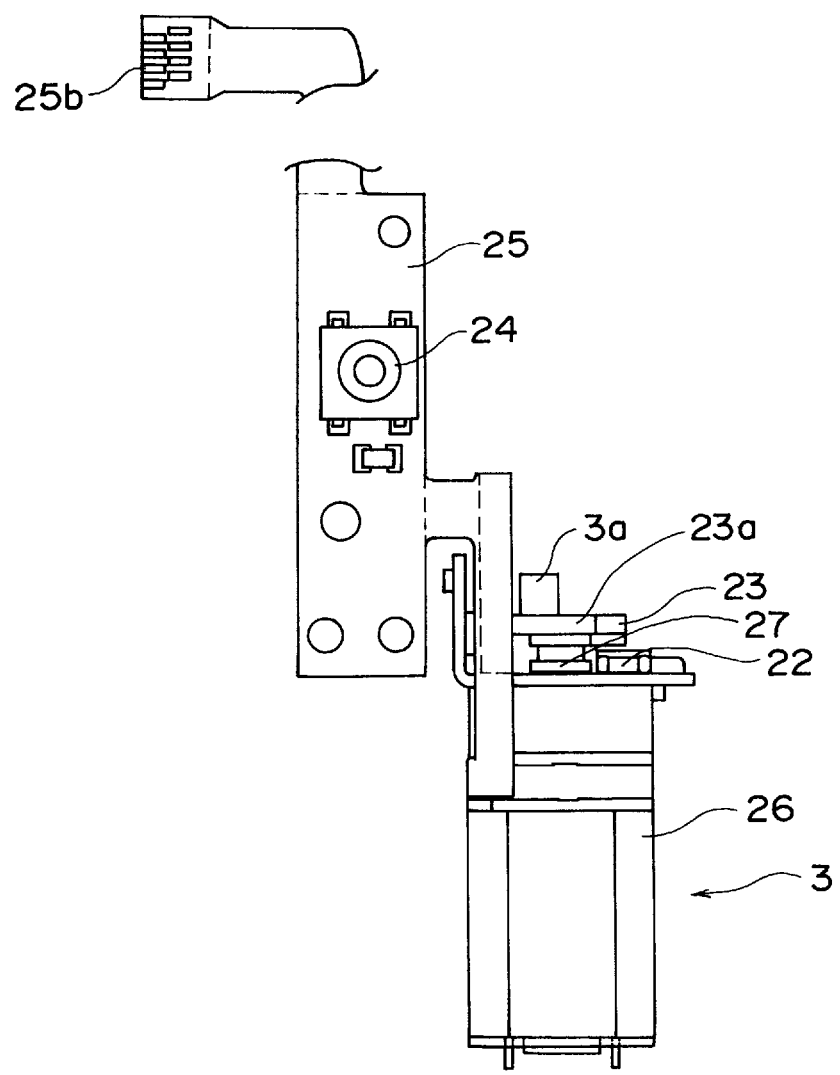
FIG. 8B is a side view of the ejecting motor assembly 3.

In FIGS. 8A and 8B, the ejecting motor assembly 3 is contained in a limited space in the side wall of the base 1 and has a function to press in the direction of the arrow P3 shown in FIG. 5.

For this reason, a small DC motor 26 is used and a disk 23 on which a pin 3a is fixed is turned for a predetermined angle via a reduction gear 27. For this predetermined rotation, a hole element sensor 22 is fixed on the side of the DC motor 26. The hole element sensor 22 is activated when the permanent magnet 23a fixed on the disk 23 approaches. The DC motor 26 is connected to the flexible plate 25 having a push switch 24 and the leading end of the connector 25b is directly inserted into a control circuit board.

The above ejecting motor assembly 3 is driven based on the instruction for ejecting the magneto-optic disk. It is rotated in the arrow's direction shown in FIG. 8A and contacts to the end 16c of the slide plate 16 when it is turned through 30 degrees. It is further rotated through 90 degrees and presses the end 16c in the direction P3, resulting in release of the engaging state. In FIG. 5, a second end 16f on which the bending processing is performed so as to stand to the front is formed on the left side of the end 16c of the slide plate 16. When this portion is directly pushed by the tool with a sharp point through the hole provided on the panel 7, the operation of the ejecting motor assembly 3 is enabled and the engaging state is released. Thus, the magneto-optic disk 100 is ejected even when the electric power happens to be shut down.

Figure 9:
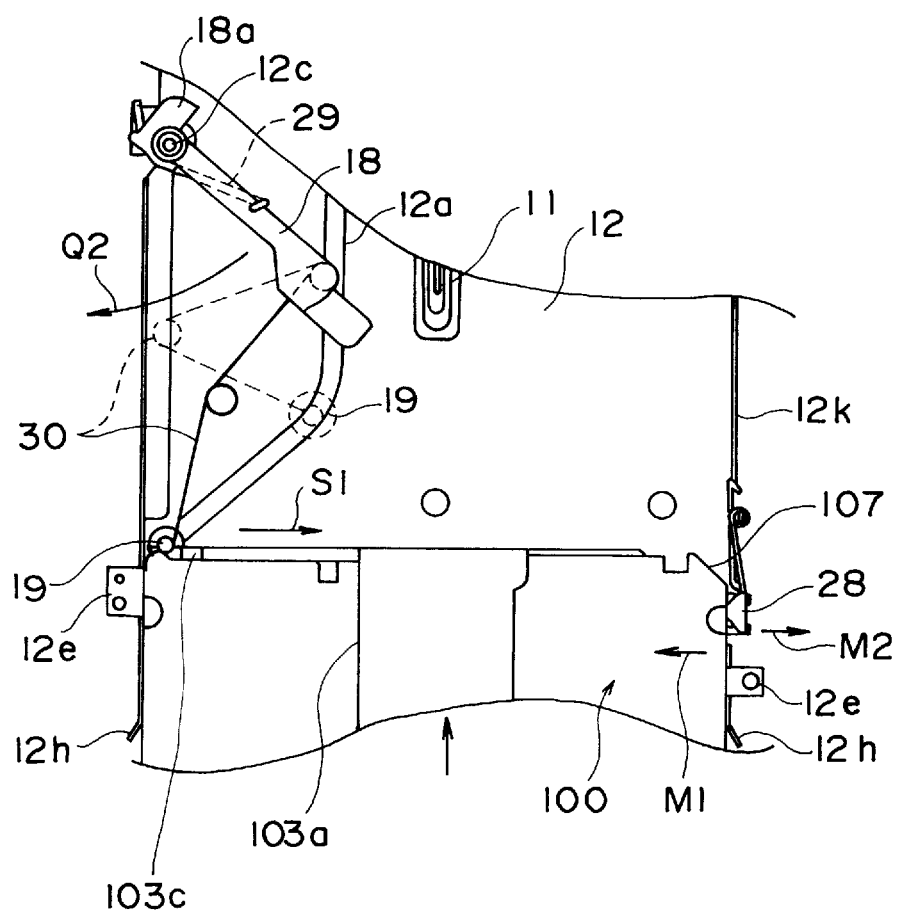
FIG. 9 is a diagram of the magneto-optic disk apparatus, taken in the direction of arrow X—X in FIG. 4.

FIG. 9 is a cross-sectional view of the magneto-optic disk apparatus, taken in the direction of arrow X—X in FIG. 4. It is a view where the plate base 12 is removed from the base 1. In FIG. 9, the plate base 12 reserves a space for the magneto-optic disk 100, a guide 12h which directly connects to a chamfer 107 when the magneto-optic disk is inserted is formed, a concavity 12e fixed on the base 1 by screwing is provided, and a wall 12k where the bending processing is performed on both ends in order to maintain the strength is formed.

A brake stopper 28 is provided near the guide 12h on the right side of the wall 12k so as to move in the orthogonal direction with respect in the direction where the disk has been inserted. The brake stopper 28 is constantly energized in the direction of the arrow M1 and moves in the direction of the arrow M2 by the chamfer 107 when the magneto-disk 100 is inserted, while the stopper (or brake) 28 stays in the original position when the magneto-disk 100 is inserted upside-down.

The arm 18 is supported rotatably by a stud 12c caulked at the left side of the plate base 12 and the large torsion bar spring 29 having ejecting force is hung as shown in FIG. 9. The arm 18 is further provided with the small torsion bar spring 30 where one end is rotatable and the other end is rotatable for the open pin 19 for opening/closing the shutter 103.

Furthermore, the open pin 19 is provided so as to fit in the guide groove 12a formed on the plate base 12. As the magneto-optic disk 100 is inserted, the end of the slide portion 103c of the shutter 103 is pushed and moved in the direction of the arrow S1 in the figure. When it is ejected, the shutter 103 is closed by the energy built in the magneto-optic disk 100 shown in FIG. 9.

The spring force of the small torsion bar spring 30 is set small in comparison with that of the large torsion bar spring 29. If the open pin 19 is moved in the guide groove 12a when the magneto-optic disk 100 is inserted as shown the state indicated by the broken line, the arm 18 will not be operated. When the magneto-optic disk 100 is further inserted to the back and the arm 18 directly contacts the side face of the case, the arm 18 is rotated against the spring force of the large torsion bar spring 29.

The above arm 18 is engaged to the slide member 16k of the slide plate 16 and the base 13 providing the chucking motor 10 performs a horizontal movement to the base 1 by interlocking to the insertion of the magneto-optical disk.

Figure 10:
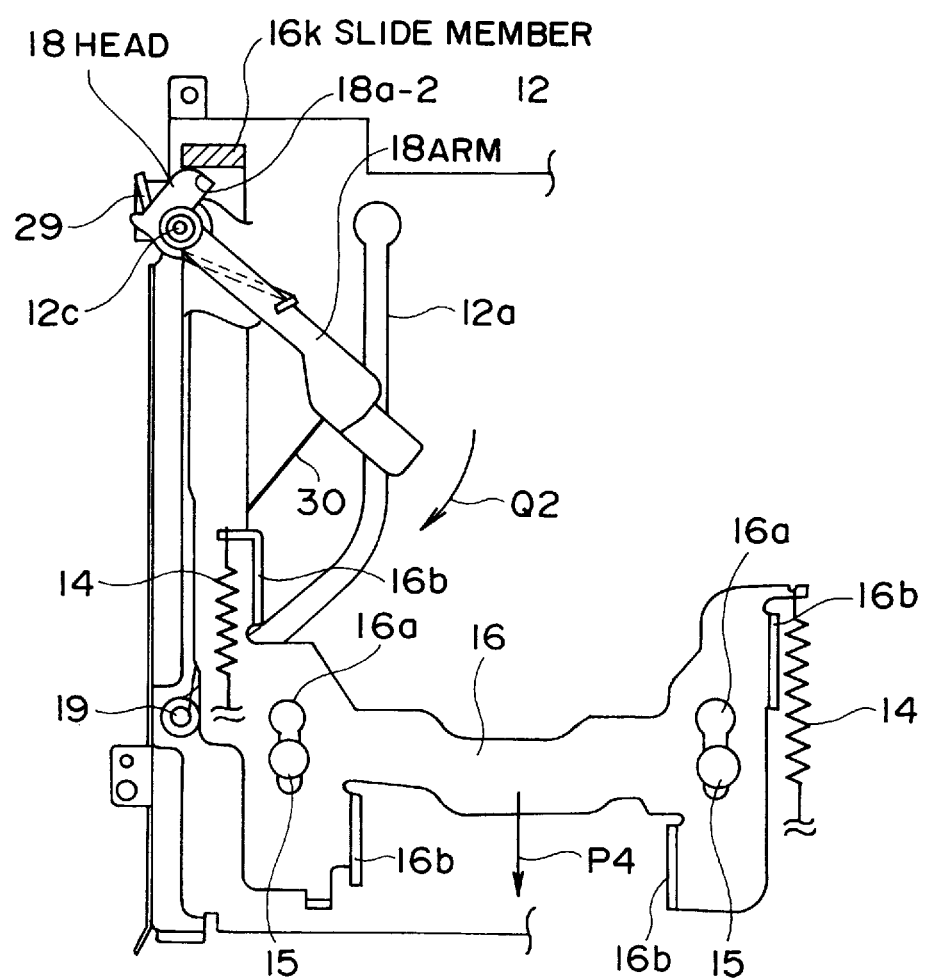
FIG. 10 is a diagram illustrating the state where the arm 18 is engaged with the slide plate 16.
Figure 11:
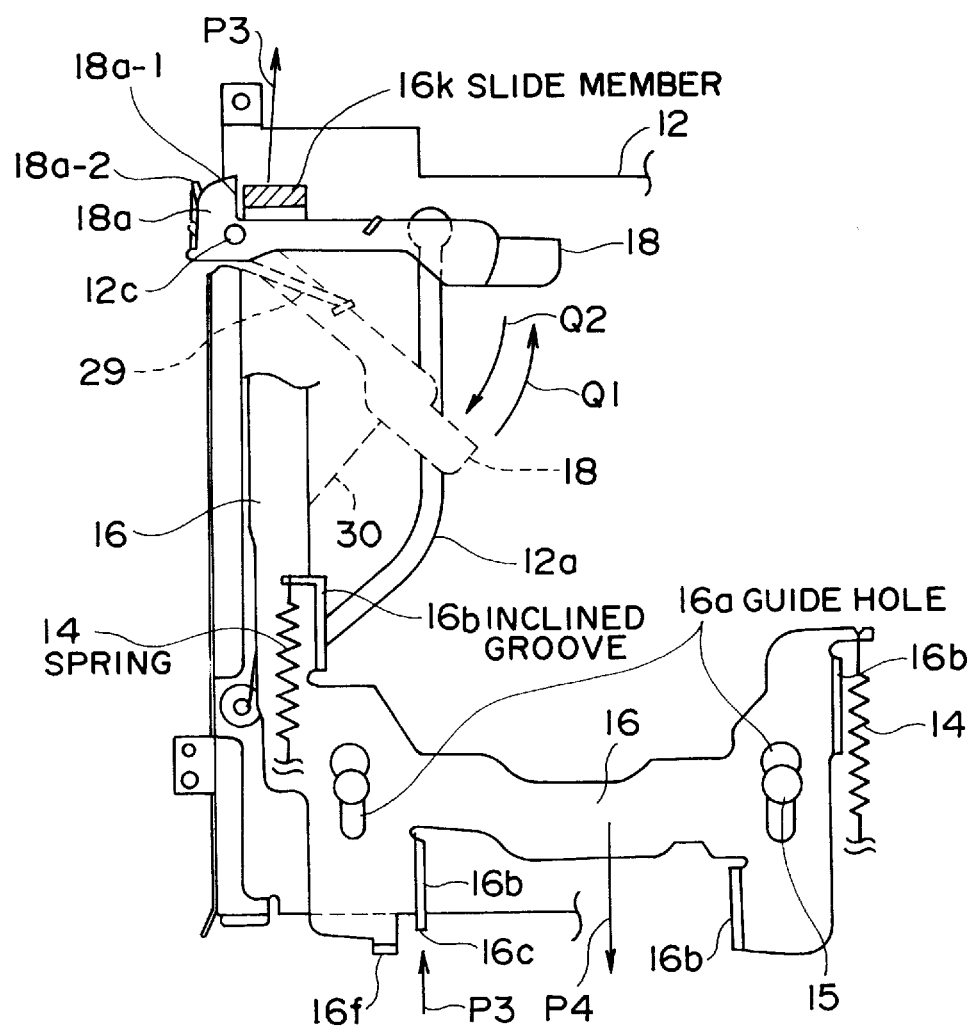
FIG. 11 is a diagram explaining the operation of FIG. 10.

FIG. 10 is a top view showing the state where the arm 18 is engaged with the slide plate 16. FIG. 11 is a diagram for explaining the operation of FIG. 10. FIG. 10 shows the state where the magneto-optic disk has not inserted yet. As described above, based on FIG. 4, a contacting surface 18a-2 of the head 18a of the arm 18 contacts to the slide member 16k indicated by a broken line fixed on the slide plate 16 which obtained the energy force to move in the direction of the arrow P4 by the pair of tension spring 14. Then, the slide plate 16 is prevented to move against the tension spring 14. From the state shown in FIG. 10, if the magneto-optic disk is inserted and the arm 18 contacts the case, the arm 18 is rotated from the position indicated by the broken line against the repellent of the large torsion bar spring 29 and moved to the position indicated by a solid line, the state where the contacting surface 18a-2 of the head 18a of the arm 18 controls the slide member 16k in its movement is released and the arm 18 moves and stops at the position indicated by the solid line.

By this movement, the pins 17 which are respectively fitted into the four inclined holes 16b of the slide plate 16 are moved in the inclined holes 16b and try to move the base 13 having these pins on the side face in the slanted downward direction. However, the base 13 is controlled so as to move in the vertical direction by the guide pin 1c fixed on the base 1, therefore, the base 13 is moved from the state shown in FIG. 4 in the direction of the arrow P1 and the disk 100 is contained as shown in FIG. 5.

As shown in FIG. 5, the chucking of the chucking flange 10a of the chucking motor 10 and the disk medium 120 is performed and the process ends.

When the magneto-optic disk 100 under the chucking state is ejected to the outside, an ejecting instruction signal is transmitted to the ejecting motor assembly 3, the pin 3a of the motor assembly 3 is rotated for a predetermined angle, and the end 16c of the slide plate 16 is pressed in the direction of the arrow P3.

As a result, the slide member 16k fixed on the slide plate 16 is similarly moved in the direction of the arrow P3 and the slide member 16k is removed from the engaging face 18a-1 of the head 18a of the arm 18. Since the arm 18 has turning effort in the direction of the arrow Q2 which can eject the magneto-optic disk 100 by the energy force of the large torsion bar spring 29, the slide member 16k is removed from the engaging face 18a-1 of the head 18a and the arm 18 returns to the position indicated by the broken line in FIG. 1. Then, the press operation by the ejecting motor assembly 3 is released and the magneto-optic disk is ejected when the slide member 16k contacts with the contacting surface 18a-2 (FIG. 10) of the head 18a of the arm 18 by the tension spring 14.

As described above, when the magneto-optic disk has been inserted in the container of the apparatus, the chucking motor is moved to the magneto-optic disk side. Accordingly, the appearance is similar to that of the conventional magnetic disk.

Therefore when the above arrangement is adapted to a magneto-optic disk, the thickness is reduced to approximately ⅔ of the conventional magneto-optic disk apparatus.

As many apparently widely different embodiments of the present invention can be made without departing from the spirit and scope thereof, it is to be understood that the invention is not limited to the specific embodiments thereof except as defined in the appended claims.

What is claimed is:

1. A disk apparatus for recording information to a magneto-optic disk medium, comprising:

a stationary base having a stationary surface facing to a first surface of the magneto-optic disk medium, said stationary base mounting an arm for ejecting the magneto-optic disk medium such that the arm moves along the stationary surface;

an optical system for impinging a light beam on a second surface of the magneto-optic disk medium;

a flat coil, unmovably fixed to the stationary surface of said stationary base and faced to the first surface of the magneto-optic disk medium, for generating a magnetic field to an area where the light beam is impinged by said optical system for recording the information to the magneto-optic disk medium;

carrying means for carrying said optical system along the second surface of the magneto-optic disk medium;

containing means for containing the disk medium, said containing means being fixed with respect to the stationary surface to be unmovable with respect to said stationary base, and having portions for guiding the disk medium only along a straight translational path during insertion or ejection with respect to the containing means;

engaging means for engaging with the disk medium contained in said containing means, said engaging means facing to the second surface of the disk medium;

a motor for rotating said engaging means with the magneto-optic disk medium; and moving means for moving said motor with said engaging means between an engaging position where said engaging means engages with the disk medium and a waiting position permitting the disk medium to be inserted or ejected with respect to said containing means.

2. The disk apparatus according to claim 1, further comprising a detector which detects whether or not said magneto-optic disk medium is present in said containing means.

3. The disk apparatus according to claim 1, wherein said magneto-optic disk medium is contained in a hard case having a chamfer, and further comprising:

a brake member, provided on a side face portion of said containing means, for moving by contact with said chamfer of the hard case of the disk medium and contacting the hard case for braking.

4. A disk apparatus for recording information to a magneto-optic disk medium, comprising:

a stationary base having a stationary surface facing to a first surface of the magneto-optic disk medium, said stationary base mounting an arm for ejecting the magneto-optic disk medium such that the arm moves along the stationary surface;

an optical system for impinging a light beam on a second surface of the magneto-optic disk medium;

a flat-type magnetic field generating means, unmovably fixed to the stationary surface of said stationary base and facing the first surface of the magneto-optic disk medium, for generating a magnetic field to an area where the light beam is impinged by said optical system for recording the information to the magneto-optic disk medium;

carrying means for carrying said optical system along the second surface of the magneto-optic disk medium;

containing means for containing the disk medium, said containing means being unmovable with respect to said stationary base, and having portions for guiding the disk medium only along a straight translational path during insertion or ejection with respect to the containing means;

engaging means for engaging with the disk medium contained in said containing means, said engaging means facing to the second surface of the disk medium;

a motor for rotating said engaging means with the magneto-optic disk medium; and moving means for moving said motor with said engaging means between an engaging position where said engaging means engages with the disk medium and a waiting position permitting the disk medium to be inserted or ejected with respect to said containing means.

5. The disk apparatus according to claim 1, wherein said carrying means comprises:

a first mechanism including a first guide shaft for guiding said optical system radially with respect to the surface of the disk medium and a first linear motor carrying the optical system along the first guide shaft; and a second mechanism including a second guide shaft for guiding said optical system radially with respect to the surface of the disk medium and a second linear motor carrying the optical system along the second guide shaft, the first guide shaft and the first linear motor and the second guide shaft and the second linear motor being arranged in parallel with and along the surface of the disk medium, and the first mechanism being at a first side of the optical system an the second mechanism being at a second side of the optical system.

* * * * *